Nov. 6, 1945.  F. LE B. LORD  2,388,273
LOCK STUD
Filed Oct. 3, 1944
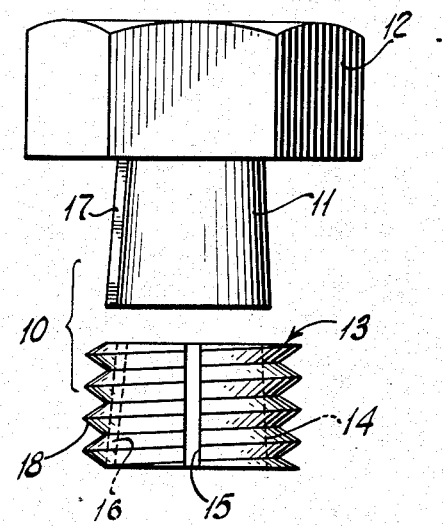
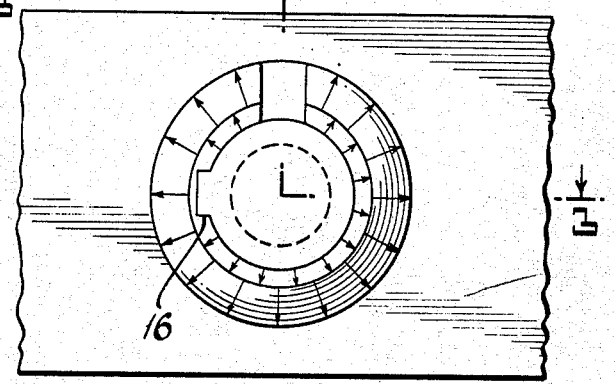
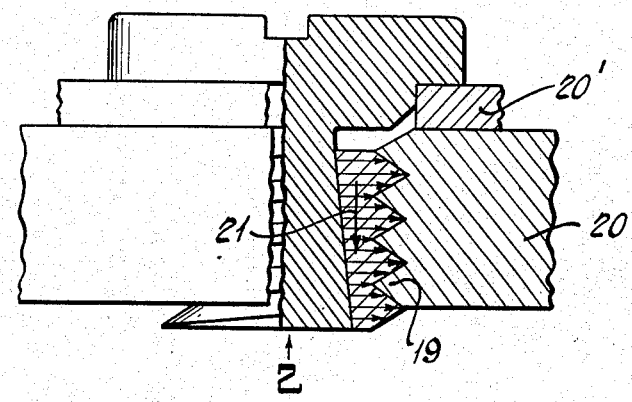
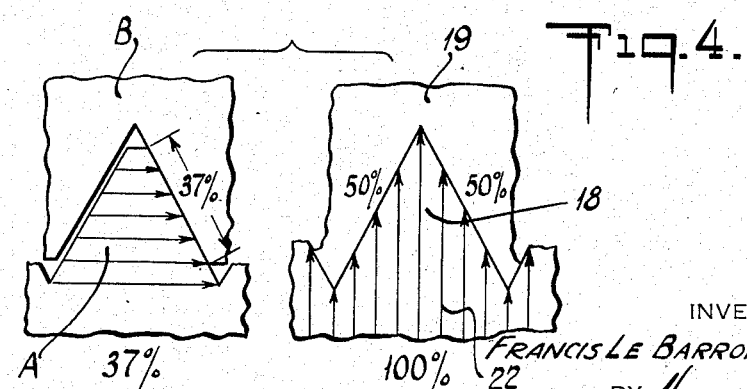
INVENTOR
FRANCIS LE BARRON LORD.
BY
ATTORNEY Patented Nov. 6, 1945

2,388,273

UNITED STATES PATENT OFFICE 2,388,273

LOCK STUD

Francis Le Barron Lord, Bloomfield, N. J., assignor to Titelox Manufacturing Company, Montclair, N. J., a corporation of New Jersey Application October 3, 1944, Serial No. 556,983

4 Claims. (Cl. 151—19)

This invention relates to improvements in studs, such as are adapted to be threaded into a threaded aperture to hold members thereto.

The object of this invention is to provide a stud of such construction that the threaded portion thereof will expand during the threading process so that the threaded portion of the stud and the threaded aperture engaged thereby will be effectively locked together in a substantially unitary and sealed manner.

A further object of the invention is to provide a lock stud of such structure as to enable the attainment of a predetermined wrapping effect on the assembly of the parts.

An embodiment of a structure employing my invention is shown in the accompanying drawing and described in detail in the ensuing specification. This embodiment is merely by way of example; my invention is not limited thereto but includes all other forms which would come within the scope of the appended claims.

In the drawing,

Fig. 1 is a disassembled, side elevational view of the lock stud unit of my invention, Fig. 2 is a bottom plan view thereof taken on line 2 of Fig. 3, Fig. 3 is a vertical, partly sectional, partly fragmentary, view taken on line 3—3 of Fig. 2 in the direction of the arrows, and Fig. 4 graphically illustrates the comparative effectiveness of the lock stud of my invention relative to standard thread engaging members.

In the embodiment of the invention shown in Fig. 1 of the drawing, the lock stud unit 10 comprises an internal stud member 11 and an external ring member 13 adapted to be slidably arranged thereon as hereinafter more particularly described. The internal stud member 11 is provided with a head 12 which may be of any convenient or desired configuration; it may, for example, as shown in Fig. 1 of the drawing, be of hexagonal configuration or, as shown in Fig. 3, of circular form with a medial recess for facility in rotating the same. The stud member 11 is externally tapered and is provided with a key 17. The external ring member 13 is externally threaded as at 18, is provided with an internal tapered aperture 14, and is vertically slitted as at 15 and provided with an internal keyway 16 for reception of the key 17.

In operation, when it is desired to engage the threaded portion 19 defining the aperture for reception of the stud member in object 20 for the purpose of holding an object 20' thereto or for any other or analogous purpose, the lock stud unit of my invention may be threaded to the threaded portion 19 of the member 20 as follows: The ring 13 is positioned on the stud 11 with the key 17 of the latter received within the keyway 16 of the ring and the lock stud unit is aligned with the threaded aperture of the object 20. On rotating the lock stud 11 (by means of the head 12 thereof) the threaded ring 13 will threadedly engage the threads 19 defining the aperture of the object 20 until the stud head 12 abuts the object 20', or the like. Continued rotation of the stud unit will cause further threading of the parts described so that the ring 13 will be progressively advanced downwardly on the stud 11 against the resistance offered by virtue of the fact that said ring 13 is advanced toward the tapered end of the stud of greater diameter. The ring 13 is thus advanced into the threaded portion 19 of the object 20 in the direction indicated by the arrow 21 (Fig. 3) in the longitudinal axis of the lock stud unit and is simultaneously expanded laterally at right angles to the axis plane indicated by the arrow 21 and into positive contact with the threads 19 of object 20; it is thus possible to attain a high degree of efficiency in the transmission of the energy exerted in the rotating of the member 11 to the interengaging of threads 18 and 19. This is attained by virtue of the fact that the force exerted on the threaded portion 18 of the ring 13 will be the product of the movement of the ring 13 downwardly on the stud 11 in a general longitudinal axis thereof indicated by the arrow 21 multiplied by its movement outwardly at a plane at right angles thereto generally designated by the arrows 22 and into contact with the threads 19. The keyway 16 is located a predetermined circumferential point relative to the slit 15 of the ring 13 so that one may obtain a predetermined wrapping effect to resist disengagement of the parts generally corresponding to the effect of wrapping a loop about a rod wherein more than half of the loop is wrapped on the rod. If the keyway 16 is located diametrically opposite the slit 15 (which would be at a peripheral point substantially 180° from the slit 15) then the keying of stud 11 and ring 13 would be substantially at a neutral point, that is, the key-slit arrangement would equally tend to urge the parts into engagement and disengagement, instead of favoring the engagement or the disengagement of the parts which occurs where the slit is arranged at a circumferential point other than 180°. By selecting a circumferential point at which the keyway 16 is located relative to the slit 15 other than 180°, one may predetermine the wrapping effect to be attained and the greater tendency of the parts to resist disengagement, after assembly. The slit 15 permits the ring 13 to be tightly expanded against the threaded portion 19 of the member 20 with which the stud engages so that all surfaces of the engaging threads will be bound together and in contact. This feature is graphically illustrated in Fig. 4, indicating that both oppositely inclined planar surfaces of the threads 18 and 19 have this binding, contacting, effect resulting in a 100% engagement of the threads, whereas in the engagement of the threaded member A, which may be the conventional nut, with a second threaded member B which may be the conventional bolt, only part of one series of parallel planar surfaces of the threads engage with the adjacent portions of parallel series of planar surfaces of the threads. In recognition of this fact, it has been customary to flatten the crests of the threads of members A and B as shown in Fig. 4 so that the effectively engaging surfaces of the conventional threaded bolt and nut is only 37% as against the 100% thread engagement in the use of the lock nut unit of my invention.

On assembly of the parts as shown in Fig. 3, the threads 18 and 19 will be fully engaged as described above so as to provide an effective seal and the parts will automatically tend to resist displacement due to vibration or other extraneous forces. To disengage the parts, the stud 11 is rotated in a reverse direction to that used in the assembly of the parts. After rotating the stud 11 for part of a revolution, the head 12 thereof may be tapped downwardly in the general direction of the arrow 21; this action will shift the ring 13 on the stud 11, breaking the taper seal so that further rotation of the stud 11 to disengage the parts may be had with comparative ease.

If desired, the ring 13 may be provided with a plurality of keyways 16 so that the user may select one to receive the key 17 for the purpose above described, within the purview of this invention. The means for vertically keying the ring 13 to the stud member 11 may comprise a means equivalent to the key 17 and keyway 16, within the purview of this invention. Definition: The term "predetermined wrapping effect" as used in the specification and claims hereof shall be deemed to mean the location of the slit 15 relative to the keying means so that on engagement or disengagement of the members a wrapping effect is attained where the slit is located other than 180° from the keying means and where the slit is located at 180° from the keying means the wrapping effect is nil—in short, the term shall be deemed to mean predetermining whether and if so the degree of the wrapping effect to be attained by the relative location of the parts referred to.

The parts may be made of any desirable or suitable material and the dimensions thereof may be varied to suit the requirements of the use to which the same are to be put, the representation in the drawing being solely for the sake of illustrating one embodiment of the invention.

Having thus described my invention, what I claim as new and desire to secure by Letters Patent is:

1. A stud unit adapted to be threaded into a threaded aperture, comprising a tapered stud, and a ring provided with a slit, said ring being internally tapered complementary to the tapered stud and being adapted to be positioned on said stud, and keying means on said stud and ring to enable the latter to be vertically reciprocated on the stud for expansion thereon during the threading of the stud, into the first mentioned threaded aperture, said keying means being so located circumferentially relative to the slit as to provide a predetermined wrapping effect when the ring is threaded into the first mentioned threaded aperture.

2. A stud unit adapted to be threaded into a threaded aperture, comprising a stud which is tapered, and a slitted ring internally complementarily tapered and adapted to be positioned on said stud, said stud being provided with a key, said ring being provided with a keyway to receive said key to guide the ring in its vertical reciprocation on the stud for expansion of the ring on the stud during the threading of the stud into the first mentioned threaded aperture, the keying being so located circumferentially relative to the slit as to provide a predetermined wrapping effect when the ring is threaded into the first mentioned threaded aperture.

3. A stud unit adapted to be threaded into a threaded aperture, comprising a stud which is tapered, and a ring provided with a slit, said ring being internally tapered complementary to the tapered stud and being adapted to be positioned on said stud, and keying means on said stud and ring to enable the latter to be vertically reciprocated on the stud for expansion thereon during the threading of the stud into the first mentioned threaded aperture, said keying means being so located circumferentially relative to the slit as to provide a predetermined wrapping effect when the ring is threaded into the first mentioned threaded aperture.

4. A stud unit adapted to be threaded into a threaded aperture, comprising a tapered stud, and a ring provided with a slit, said ring being adapted to be positioned on said stud, and keying means on said stud and ring to enable the latter to be vertically reciprocated on the stud for expansion thereon during the threading of the stud into the first mentioned threaded aperture, said keying means being so located circumferentially relative to the slit as to provide a predetermined wrapping effect when the ring is threaded into the first mentioned threaded aperture.

F. LE BARRON LORD.